US007410551B1

(12) United States Patent
Bethune

(10) Patent No.: US 7,410,551 B1
(45) Date of Patent: Aug. 12, 2008

(54) METHOD OF HOT MARKING, AND A MULTILAYER STRUCTURE FOR IMPLEMENTING SUCH A METHOD

(75) Inventor: Alain Bethune, Savigny (FR)

(73) Assignee: L'Oreal, Paris (FR)

( * ) Notice: Subject to any disclaimer, the term of this patent is extended or adjusted under 35 U.S.C. 154(b) by 183 days.

(21) Appl. No.: 09/688,961

(22) Filed: Oct. 17, 2000

(30) Foreign Application Priority Data

Oct. 22, 1999 (FR) .................................. 99 13228

(51) Int. Cl.
*B32B 15/00* (2006.01)

(52) U.S. Cl. ....................... 156/230; 156/233; 156/234; 156/258; 156/237; 156/240; 156/241; 156/247; 156/277; 156/289; 156/272.2; 156/273.3; 156/273.7; 427/148; 427/150; 427/146; 427/147; 428/145; 428/200; 428/202; 428/204; 428/209; 428/343; 428/344; 428/354; 428/914; 428/915

(58) Field of Classification Search ................ 156/230, 156/233, 234, 258, 239, 240, 241, 247, 277, 156/289, 272.2, 273.3, 273.7, 236, 237, 272.7; 427/146-150; 428/195, 200, 262, 264, 209, 428/343, 344, 914, 915, 554, 814, 815
See application file for complete search history.

(56) References Cited

U.S. PATENT DOCUMENTS 1,124,869 A * 1/1915 Davis et al. ................. 156/233
4,133,723 A * 1/1979 Howard ....................... 204/15
4,215,170 A * 7/1980 Vilaprinyo Oliva ......... 428/328
4,294,641 A * 10/1981 Reed et al. .................. 156/234
5,391,247 A * 2/1995 Kamen et al. ............... 156/233
5,487,927 A 1/1996 Kamen et al. .............. 128/34.4
5,581,978 A * 12/1996 Hekal et al. ................... 53/411
6,059,914 A * 5/2000 Suss ........................... 156/230

FOREIGN PATENT DOCUMENTS

EP 0 668332 8/1995

(Continued)

OTHER PUBLICATIONS

Partial English-language translation of JP 1-202492, Aug. 1989.

(Continued)

*Primary Examiner*—Philip C Tucker
*Assistant Examiner*—Kimberly K McClelland
(74) *Attorney, Agent, or Firm*—Oliff & Berridge, PLC

(57) ABSTRACT

The invention relates to a hot marking method enabling decoration to be made on an article, the method comprising the steps consisting in:

supplying a multilayer structure comprising a layer of varnish that hardens under the effect of radiation, a backing layer, and a layer of decoration, the varnish layer being situated between the backing layer and the decoration layer;

bringing said multilayer structure into contact with the article;

applying pressure and heat to the backing layer at the location where it is desired to transfer the decoration layer onto the article, the varnish layer being such as to be transferred locally onto the article together with the decoration layer;

withdrawing the backing layer; and causing the layer of varnish that has been transferred onto the article to harden by exposing it to said radiation.

4 Claims, 1 Drawing Sheet

FOREIGN PATENT DOCUMENTS

| | | | |
|---|---|---|---|
| JP | 60 187583 | | 9/1985 |
| JP | 1-141086 | | 6/1989 |
| JP | 1-202492 | | 8/1989 |
| JP | 01-202492 | * | 8/1989 |
| JP | 8-39997 | | 2/1996 |
| JP | A 9-78473 | | 3/1997 |
| WO | WO- 99/06336 | | 2/1999 |

OTHER PUBLICATIONS

Partial English-language translation of JP 1-141086, Jun. 1989.

* cited by examiner

METHOD OF HOT MARKING, AND A MULTILAYER STRUCTURE FOR IMPLEMENTING SUCH A METHOD

The present invention relates to applying decoration on an article of plastics or other material, and to a method of hot marking.

BACKGROUND OF THE INVENTION

Such a method consists in bringing the article into contact with a multilayer structure having one or more transferrable layers carried by a backing layer, and in applying pressure and heat locally to the structure by means of a gilding iron.

European patent application EP-A-0 668 332 refers to that method in its introduction.

In a later step, the layers transferred onto the article are usually covered in varnish in order to protect the decoration from abrasion.

It is difficult to deposit the varnish exactly on the decoration without spreading any varnish over the article, such that as a general rule the varnish is also present around the decoration, and that can be a drawback from the point of view of appearance.

OBJECTS AND SUMMARY OF THE INVENTION

There exists a need to simplify the making of decoration by a hot marking method and to improve the appearance thereof.

The invention thus provides a novel method of hot marking enabling decoration to be made on an article, and comprising the steps consisting in:

- supplying a multilayer structure comprising a layer of varnish that hardens under the effect of radiation, a backing layer, and a layer of decoration, the varnish layer being situated between the backing layer and the decoration layer;
- bringing said multilayer structure into contact with the article;
- applying pressure and heat to the backing layer at the location where it is desired to transfer the decoration layer onto the article, the varnish layer being such as to be transferred locally onto the article together with the decoration layer;
- withdrawing the backing layer; and
- causing the layer of varnish that has been transferred onto the article to harden by exposing it to said radiation.

By means of the invention, the decoration can be protected from abrasion without an additional step of depositing varnish.

It is simpler to make the decoration, and its appearance is improved since the varnish which protects the decoration does not extend over the article but only over the layer of decoration deposited on the article.

The varnish used can be a UV thermal varnish, in particular a cationic UV thermal varnish or a hydroxylated urethane acrylate UV thermal varnish.

The varnish can include oliogomers of low molecular weight, preferably lying in the range 800 to 2000, and can contain a solvent prior to being applied on the backing layer.

Advantageously, the varnish includes one or more pigments or dyes.

Preferably, the varnish includes photo-initiators at a concentration by weight lying in the range 0.3% to 3%, and preferably about 0.5%.

The decoration layer is advantageously coated in a layer of hot-melt adhesive.

The layer of varnish is preferably exposed to said radiation while its temperature is still close to the maximum temperature it reaches when pressure and heat are applied to the backing layer, the temperature difference preferably being less than 30% of the maximum temperature.

The decoration layer can be a layer of metal vacuum-deposited on the varnish layer before the varnish layer has been exposed to the radiation that causes cross-linking therein.

In a variant, the decoration layer can be a layer of ink deposited by printing on the varnish layer before the varnish layer has been exposed to said radiation.

The invention also provides a multilayer structure for implementing a hot marking method, the structure comprising a layer of varnish that hardens under the effect of radiation, said varnish being unexposed to said radiation, a backing layer, and a layer of decoration suitable for being transferred locally onto an article by applying heat and pressure to the backing layer.

Advantageously, the decoration layer is covered in a layer of hot-melt adhesive.

Preferably, the varnish used is a UV thermal varnish.

The decoration layer can be a layer of vacuum-deposited metal or a layer of ink deposited by printing.

BRIEF DESCRIPTION OF THE DRAWING

The invention will be better understood on reading the following detailed description of a non-limiting implementation, and on examining the accompanying drawing, in which.

MORE DETAILED DESCRIPTION

Figure 1:
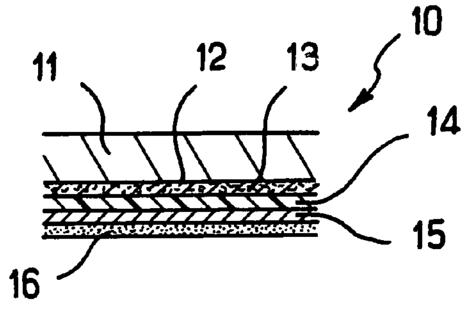
FIG. 1 is a diagrammatic section view of a multilayer structure of the invention.

The multilayer structure 10 shown in FIG. 1 comprises a backing layer 11 covered on one face 12 by a separation layer 13.

A layer of varnish 14 has one face in contact with the separation layer 13 and on its other face 17 it carries a layer of decoration 15.

The face 18 of the decoration layer 15 facing away from the varnish layer 14 is covered in a layer of adhesive 16.

The various layers 11 to 16 are shown in the figures without complying with their real proportions, in order to clarify the drawing.

By way of example, the backing layer 11 can be about 10 micrometers (μm) thick, the separation layer can be about 0.01 μm thick, the varnish layer 14 can be about 1 μm thick, the decoration layer 15 can be about 0.02 μm thick, and the adhesive layer 16 can be about 1 μm thick.

The backing layer 11 can be constituted by a polyester film, for example.

The separation layer 13 can be constituted by a covering of wax or of silicone, for example.

The separation layer 13 adheres to the backing layer 11 more strongly than to the varnish layer 14.

By way of example, the varnish layer 14 can be constituted by a cationic UV thermal varnish or by a hydroxylated urethane acrylate UV thermal varnish.

In general, the varnish used can have one or two components with or without a solvent, including oligomers of low molecular weight, preferably lying in the range 800 to 2000, and it can contain one or more pigments or dyes and photo-initiators, where the photo-initiators are preferably at a concentration by weight lying in the range 0.3% to 3%, and preferably about 0.5%.

The decoration layer 15 can be constituted by a metal such as aluminum or by ink which is deposited by printing, e.g. by an offset printing process.

The adhesive layer 16 is constituted by a hot-melt adhesive.

In a variant embodiment that is not shown, the multilayer structure also includes, between the varnish layer 14 and the decoration layer 15, a layer of varnish that is colored, e.g. yellow.

Figure 2:
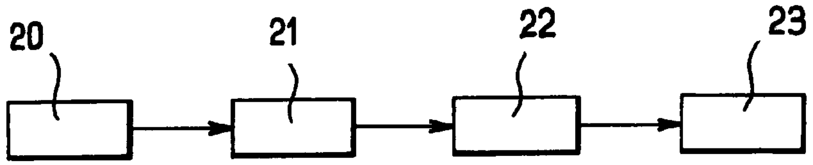
FIG. 2 is a diagram showing the various steps in fabricating the multilayer structure of FIG. 1.

To make the multilayer structure 10 and as illustrated in FIG. 2, the first step 20 is to unroll the backing layer 11 under a first coating member which deposits the separation layer 13, then the backing layer 11 as treated in this way is brought under a second coating member which deposits, in step 21, the layer of varnish 14 in the non-cross-linked state.

The varnish layer 14 is then heated to a temperature that is sufficient to initiate pre-curing, evaporating any solvent and ensuring that it is dimensionally stable on the backing layer 11.

Thereafter, in step 22, the varnish layer 14 is metallized under a vacuum so as to deposit the aluminum which constitutes the decoration layer 15.

The decoration layer adheres particularly well to the varnish layer, given that the varnish layer has not yet been exposed to UV radiation.

Finally, adhesive is deposited by means of a third coating member so as to make the adhesive layer 16 in step 23.

In the implementation described, the varnish layer 14 is colored throughout, e.g. yellow so as to imitate gold.

The dyes or pigments used for coloring the varnish layer 14 and the photo-initiators contained therein are selected in such a manner as to present absorption peaks at different wavelengths, for example respectively 420 nanometers (nm) and 300 nm.

Thus, the dyes or pigments used do not absorb the UV radiation that serves to cause the varnish to cross-link.

The multilayer structure 10 is used as follows.

Figure 3:
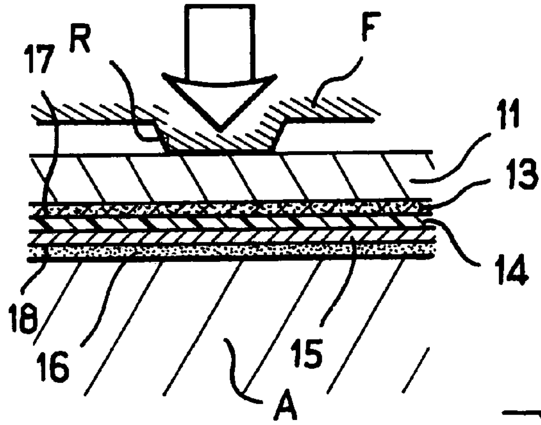
FIGS. 3 and 4 show how decoration can be put on an article.

It is brought into contact with the outside surface of an article A to be decorated, and a gilding iron F having portions in relief R corresponding to the pattern to be made is used to apply pressure and heat to the outside face of the backing layer 11, as shown in FIG. 3.

The pressure and the heat from the gilding iron F are transmitted through the various layers of the multilayer structure 10 to the adhesive layer 16 which attaches to the article A.

Figure 4:
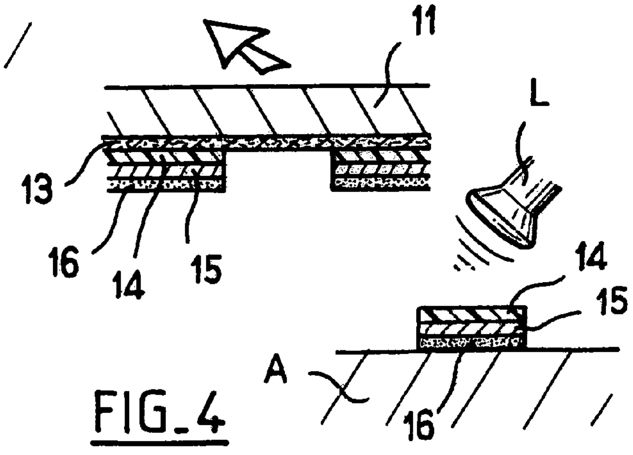

When the multilayer structure 10 is withdrawn, as shown in FIG. 4, the decoration layer 15 remains on the article A at locations where pressure and heat were applied locally.

The separation layer 13 facilitates detachment of the varnish layer 14.

The separation layer 13 remains attached to the backing layer 11 when it is withdrawn.

The portions of the decoration layer 15 secured to the article A by the adhesive layer 16 are themselves covered on their outside faces by the varnish layer 14 which is then exposed to short wavelength ultraviolet radiation (UVB) emitted by a source L.

Exposure to the UV radiation causes the varnish to become cross-linked and hardens it.

After it has cross-linked, the varnish layer 14 constitutes protection against abrasion and unlike the prior art there is no need subsequently to deposit a layer of protective varnish on the decoration.

It will be observed that the power required from the source L can be relatively low when the decoration layer 15 is a layer of metal since the radiation reflected by said layer of metal into the layer of varnish 14 contributes to activating the photo-initiators.

Thus, the power of the source L can be about 100 watts per centimeter (W/cm) for example (where power is measured per unit length of the bulb).

The varnish layer 14 is preferably exposed to the ultraviolet radiation immediately after the backing layer 11 has been withdrawn so as to take advantage of the fact that the varnish is still relatively hot and thus more sensitive to exposure to ultraviolet radiation.

The gilding iron F is used in such a manner as to apply the heat and pressure required for obtaining the desired result, e.g. by being raised to a temperature of about 150° C.

Where appropriate, the article A can be subjected to surface treatment in order to improve adhesion of the decoration.

The invention claimed is:

1. A hot marking method enabling decoration to be made on an article, comprising:

supplying a multilayer structure comprising a layer of varnish that hardens under the effect of radiation, a backing layer, and a layer of decoration, the varnish layer being situated between the backing layer and the decoration layer;

bringing said multilayer structure into contact with the article;

applying pressure and heat to the backing layer at a location where it is desired to transfer the decoration layer onto the article, the varnish layer being transferred locally onto the article together with the decoration layer;

withdrawing the backing layer; and causing the layer of varnish that has been transferred onto the article to harden by exposing it to said radiation, wherein the varnish layer and the decoration layer both remain on an external surface of the article after the transfer, and wherein the varnish layer is exposed to said radiation while temperature thereof is still close to maximum temperature thereof at time when pressure and heat are applied to the backing layer, a temperature difference between the temperature and the maximum temperature being less than 30% of the maximum temperature.

2. A hot marking method enabling decoration to be made on an article, comprising:

supplying a multilayer structure comprising a layer of varnish that hardens under the effect of radiation, a backing layer, and a layer of decoration, the varnish layer being situated between the backing layer and the decoration layer;

bringing said multilayer structure into contact with the article;

applying pressure and heat to the backing layer at a location where it is desired to transfer the decoration layer onto the article, the varnish layer being transferred locally onto the article together with the decoration layer;

withdrawing the backing layer; and causing the layer of varnish that has been transferred onto the article to harden by exposing it to said radiation, wherein the decoration layer remains coherent after the transfer on the article, and wherein the varnish layer is exposed to said radiation while temperature thereof is still close to maximum temperature thereof at time when pressure and heat are applied to the backing layer, a temperature difference between the temperature and the maximum temperature being less than 30% of the maximum temperature.

3. A method according to claim 1, wherein the varnish is partially cured by exposure to heat prior to the transfer.

4. A method according to claim 2, wherein the varnish is partially cured by exposure to heat prior to the transfer.

* * * * *